US010475112B2

(12) United States Patent
Montmorency

(10) Patent No.: US 10,475,112 B2
(45) Date of Patent: Nov. 12, 2019

(54) VENDOR TRAY AND METHOD FOR VENDING AT A LIVE EVENT

(71) Applicant: Nicolas Montmorency, Repentigny (CA)

(72) Inventor: Nicolas Montmorency, Repentigny (CA)

( * ) Notice: Subject to any disclaimer, the term of this patent is extended or adjusted under 35 U.S.C. 154(b) by 1132 days.

(21) Appl. No.: 14/820,945

(22) Filed: Aug. 7, 2015

(65) Prior Publication Data

US 2016/0059994 A1 Mar. 3, 2016

Related U.S. Application Data

(60) Provisional application No. 62/042,835, filed on Aug. 28, 2014.

(51) Int. Cl.
| | |
|---|---|
| *G06Q 10/00* | (2012.01) |
| *G06Q 30/06* | (2012.01) |
| *A47B 23/00* | (2006.01) |
| *A47F 3/14* | (2006.01) |

(52) U.S. Cl.
CPC ....... *G06Q 30/0641* (2013.01); *A47B 23/002* (2013.01); *A47F 3/14* (2013.01)

(58) Field of Classification Search
CPC ...... G06Q 30/0641; A47B 23/002; A47F 3/14
See application file for complete search history.

(56) References Cited

U.S. PATENT DOCUMENTS

| | | | |
|---|---|---|---|
| 5,579,036 A | * | 11/1996 | Yates, IV ............... G06F 3/044 178/18.06 |
| 6,762,732 B2 | | 7/2004 | Blotky et al. |
| 6,903,874 B1 | | 6/2005 | Karterman |
| 8,550,288 B2 | | 10/2013 | Briar et al. |
| 2002/0108279 A1 | | 8/2002 | Hubbard, II et al. |
| 2008/0022569 A1 | * | 1/2008 | Winn ...................... G09F 25/00 40/457 |
| 2008/0195491 A1 | | 8/2008 | Hostetler et al. |
| 2009/0159761 A1 | | 6/2009 | Sandy |
| 2012/0074823 A1 | * | 3/2012 | Bezich ............... A47B 87/0292 312/240 |

FOREIGN PATENT DOCUMENTS

CA  2800104 A1 * 6/2014  ............. B65D 85/00

OTHER PUBLICATIONS

English Abstract of JP2008005884(A), "Thin-Screen Display Device-Mounted Tray", published on Jan. 17, 2008.
(Continued)

*Primary Examiner* — Pete T Lee
(74) *Attorney, Agent, or Firm* — Bereskin & Parr LLP/S.E.N.C.R.L., s.r.l.

(57) ABSTRACT

A vendor tray includes a bottom wall; and a plurality of upstanding walls extending from the bottom wall and defining with the bottom wall a vending space for carrying the vendible items, at least one of the upstanding walls has a first viewable electronic display. A method for vending items at a live event, includes displacing the vendor tray through an audience of the live event while displaying on an viewable electronic display of an upstanding wall of the vendor tray a first graphic providing information related to at least one of the vendible item and the live event.

21 Claims, 8 Drawing Sheets

(56) References Cited

OTHER PUBLICATIONS

Hardy, Abstract and Partial Machine Translation of DE102013005853A1, Transport Container E.G. Glass Bottle for Storing Chemical or Food Products, has Display installed at Outer and Supplied with Information Over Electronic Control Circuit and Communication Unit for Variable Optical Representation, Published on Oct. 10, 2013.

Clément et al., Abstract and Partial Machine Translation of WO2013178643A1, "Digital Device for Keeping Beverages Cold, System and Method", Published on Dec. 5, 2013.

Keg Bot, "JockeyBot: A Mobile, Beer-Slinging, Photo-snapping Party Robot", http://blog.kegbot.org/post/75904674632/jockeybot-a-mobile-beer-slinging-photo-snapping, Retrieved on Jul. 8, 2015.

English Abstract of CN202339599(U), "Refrigeration and heating type portable advertisement beverage dispenser", Published on Jul. 18, 2012.

English Abstract of DE102004063665, "Drink crate vending system has arrangement for transporting drink from storage chamber to output device, selection device for locating drink to be sold, payment device, forms vending system for complete crates of drinks", Published on Jul. 13, 2006.

English Abstract of GR1006733, "Lighted Serving Tray", Published on Mar. 17, 2010.

\* cited by examiner

VENDOR TRAY AND METHOD FOR VENDING AT A LIVE EVENT

CROSS-REFERENCE TO RELATED APPLICATIONS

The present application claims priority on U.S. 62/042,835 filed on Aug. 28, 2014, which is hereby incorporated by reference in its entirety.

FIELD OF THE DISCLOSURE

The present disclosure relates to a vendor tray and method for vending at a live event, and more particularly a tray and method in which information is displayed on a viewable electronic display of one upstanding wall of the vendor tray.

BACKGROUND OF THE DISCLOSURE

Sale of food, drinks, merchandise and event-related items at a live event can account for a substantial amount revenue generated at the live event. One common way of selling food, drinks and merchandise is through vendors who carry these vendible items in a vendor tray through the audience at the live event. In this way, the audience can purchase a vendible item without having to miss a portion of the live event.

It is common for the vendor tray to have on its outer surface some form of textual and/or graphical information relating to the live event or the vendible item in the tray. For example, the information may pertain to the type of product, the brand and/or the price per unit of item. However, such information is typically presented in a stationary manner.

SUMMARY OF THE DISCLOSURE

It would thus be highly desirable to be provided with an apparatus or a method that would at least partially solve one of the problems previously mentioned or that would be an alternative to the existing technologies.

According to one aspect, there is provided a vendor tray comprising a bottom wall; and a plurality of upstanding walls extending from the bottom wall and defining with the bottom wall a vending space for carrying the vendible items, at least one of the upstanding walls has a first viewable electronic display.

According to another aspect, there is provided a method for vending items at a live event, the method comprising providing a vendor tray having at least one vendible item supported therein, displacing the vendor tray through an audience of the live event, and while displacing the vendor tray through the audience, displaying on an viewable electronic display of an upstanding wall of the vendor tray a first graphic providing information related to at least one of the vendible item, an advertisement or publicity and the live event.

BRIEF DESCRIPTION OF THE DRAWINGS

The following drawings represent examples that are presented in a non-limitative manner.

DETAILED DESCRIPTION OF THE DISCLOSURE

Figure 1:
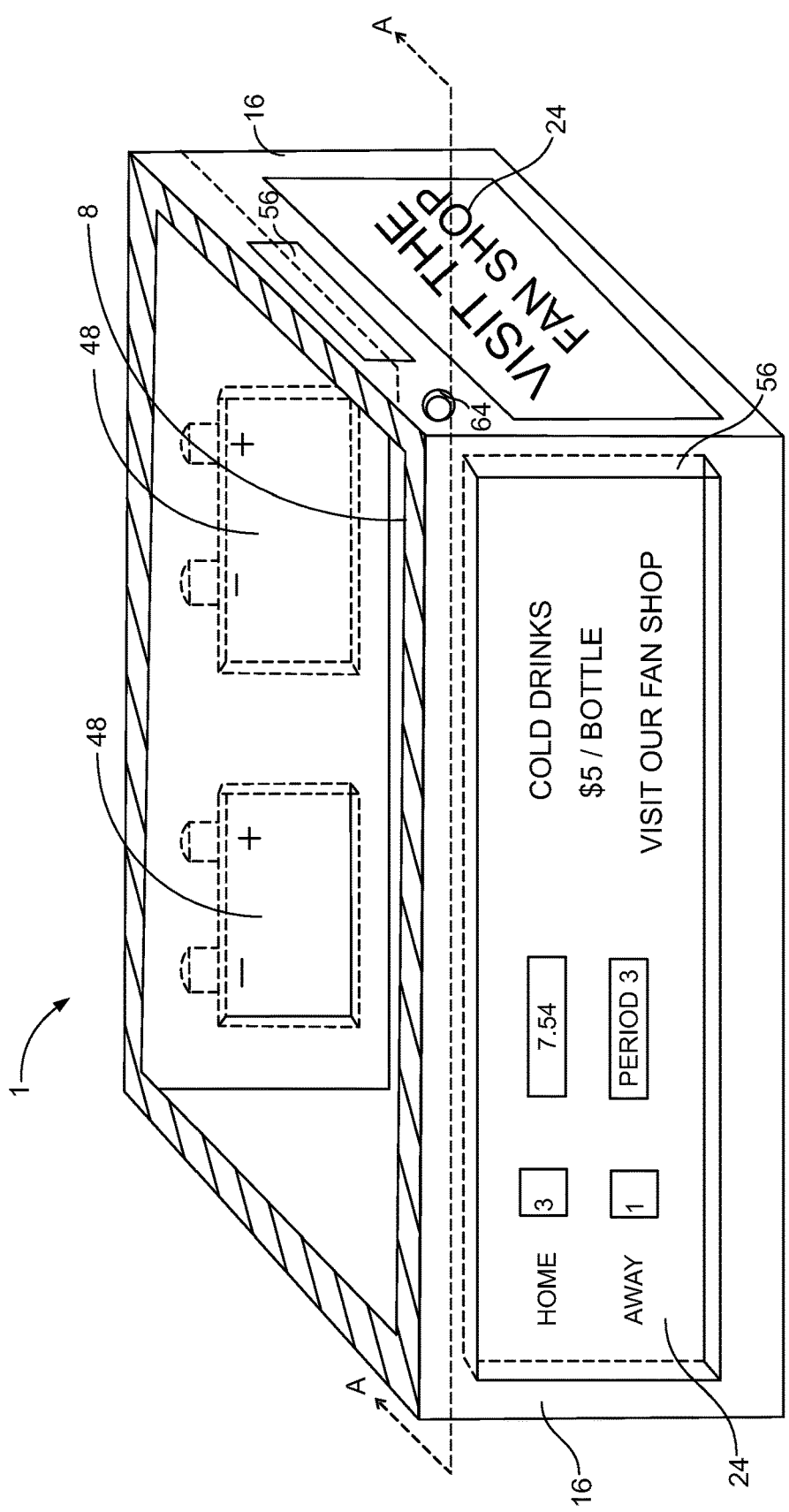
FIG. 1 illustrates a perspective view of a vendor tray according to various exemplary embodiments.
Figure 2:
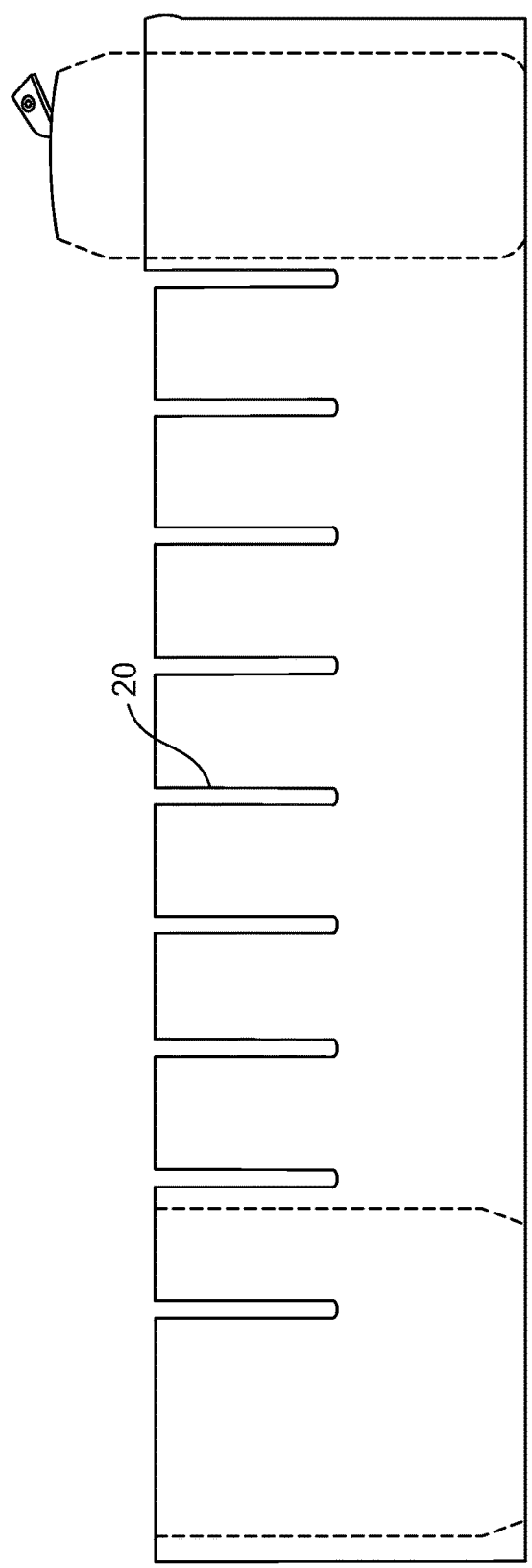
FIG. 2 illustrates a cross-sectional view of the vendor tray according to various exemplary embodiments.
Figure 3:
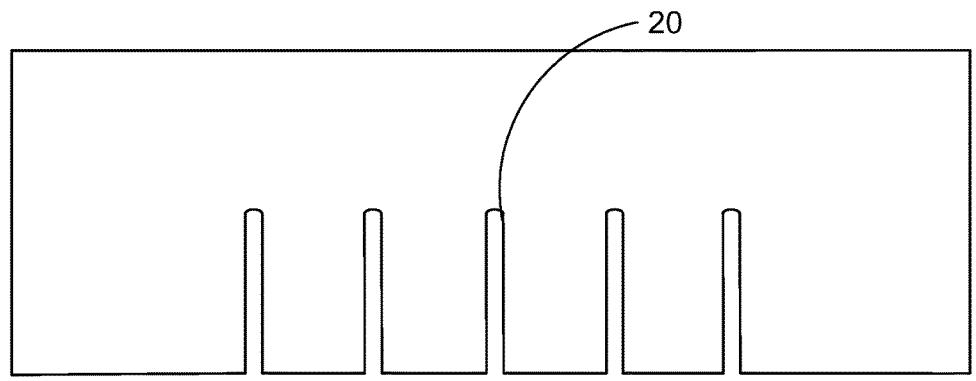
FIG. 3 illustrates a cross-sectional view of the vendor tray according to various exemplary embodiments.

The following examples are presented in a non-limitative manner.

For example, according to vendor trays disclosed herein, at least one of the upstanding walls is an audience-facing wall and another one of the upstanding walls is a vendor-facing wall, and wherein the audience-facing wall has the first viewable electronic display.

For example, according to vendor trays disclosed herein, a battery pack powering the first viewable electronic display is disposed within the vendor-facing wall.

For example, according to vendor trays disclosed herein, the vendor-facing wall is free of a viewable electronic display.

For example, according to vendor trays disclosed herein, the vendor-facing wall has a viewable electronic display having a viewable area that is substantially smaller than a viewable area of the first viewable electronic display.

For example, according to vendor trays disclosed herein, the upstanding walls define a generally quadrilateral shape, and wherein a second upstanding wall sharing a first corner with the first upstanding wall comprises a second viewable electronic display and a third upstanding wall sharing a second corner with the first upstanding wall comprises a third viewable electronic display.

For example, according to vendor trays disclosed herein, the two upstanding walls sharing a corner with the first upstanding wall each comprise a tray handling mechanism.

For example, according to vendor trays disclosed herein, the tray handling mechanism is chosen from a hanging handle, an integrated handle, a strap attachment, and a harness attachment.

For example, according to vendor trays disclosed herein, a first of the tray handling mechanism is located on a top portion of the second upstanding wall and the second viewable electronic display is positioned below the first tray handling mechanism.

For example, according to vendor trays disclosed herein, a battery pack is disposed within a fourth upstanding wall opposite the first upstanding wall.

For example, according to vendor trays disclosed herein, the fourth upstanding wall is free of a viewable electronic display.

For example, according to vendor trays disclosed herein, the upstanding walls define a generally trapezoidal shape, the first upstanding wall corresponding to a first parallel wall and the fourth wall corresponding to a second parallel wall opposite the first upstanding wall.

For example, according to vendor trays disclosed herein, the first upstanding wall comprises a recess, the first viewable electronic display being disposed within the recess; and a transparent protective member for shielding the viewable electronic display.

For example, according to vendor trays disclosed herein, the transparent protective member reduces glare reflecting from the viewable electronic display.

For example, vendor trays disclosed herein further comprise a controller operatively coupled to the at least one viewable electronic display, the controller configured for: controlling the at least one viewable electronic display to display a first graphic at a first point in time; and controlling the at least one viewable electronic display to display a second graphic at a second point in time.

For example, vendor trays disclosed herein further comprise a data port operationally coupled to the controller, the controller receiving display commands from a data storage device inserted in the data port, the commands for controlling the at least one viewable electronic display.

For example, vendor trays disclosed herein further comprise a wireless communication module for receiving instructions from a remote wireless devices, the instructions for controlling the at least one viewable electronic display.

For example, methods disclosed herein further comprise displaying a second graphic providing information related to the at least one of the vendible item, an advertisement or publicity and the live event, the second graphic being different from the first graphic.

For example, according to vendor trays disclosed herein, the first graphic provides information related to the vendible item, an advertisement or publicity and the second graphic provides information related to the live event For example, according to vendor trays disclosed herein, the information related to the vendible item comprises at least one of a price of the vendible item and nutritional value of the vendible item.

For example, according to vendor trays disclosed herein, the information related to the live event includes a participant of the live event, a status of the live event, a purchasable item associated to the live event, an advertisement or publicity, and/or another event related to the live event.

For example, methods disclosed herein further comprise receiving at a communication module of the vendor tray a display command from a remote device and in response to the received display command, modifying the graphic being displayed on the viewable electronic display of the upstanding wall.

For example, the vendor tray can further comprise means for receiving a payment from a customer. For example, the tray can be provided with an electronic device that can accept electronic payment such as credit card, INTERAC™, INTERAC FLASH™, PayPass™, Square Reader™. For example, the tray can be provided with an RFID device that allows for receiving an electronic payment.

For example, the tray can comprise means for recharging the battery or batteries. For example, more than one tray could be connected together in series and they could be recharged. They could also be recharged by induction.

"Live event" as used herein refers to any event at which an audience will be gathered in order to spectate or participate together in the event. The live event may include, but is not limited to, a sporting event, a live show, a music concert, a play, or any other type of occasions where an ongoing event is being spectated by an audience.

"Vendible item" as used herein refers to any item that may be carried in a vendor tray and sold by a vendor to a member of the audience. The vendible item may be a food item, such as popcorn, chips, chocolate, hot dog, peanuts, hamburgers, smoked meat, peanuts, pretzels, candies etc. The vendible item may also be a drink item, such as soda, water, or beer. The vendible item may also be a non-edible merchandise, such as some form of souvenirs, such as event programs, clothing, etc.

Referring now to FIG. 1, therein illustrated is a perspective view of a vendor tray 1 according to various exemplary embodiments. The vendor tray 1 includes a bottom wall 8 and a plurality of upstanding walls 16 extending from the bottom wall 8. The upstanding walls 16 and the bottom wall 8 define together a vending space in which vendible items may be carried. The bottom wall 8 may be any type known in the art for used in vendor trays, such as a grid-like structure (ex: for drinks or lighter items) or a planar structure (ex: for heavier items or smaller items).

Figure 5A:
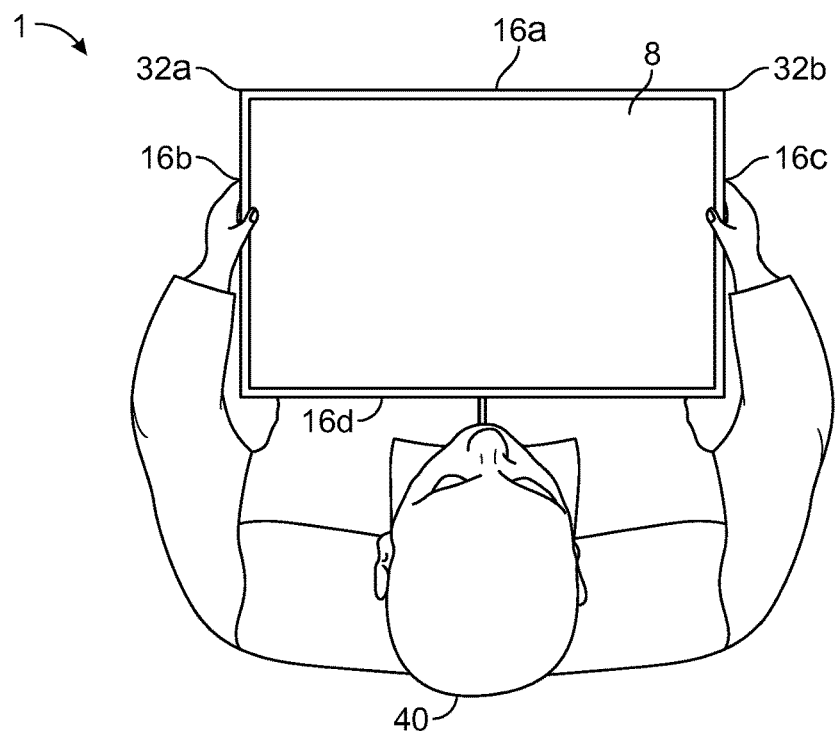
FIGS. 5A, 5B and 5C illustrate a top view of vendor trays according to various exemplary embodiments being carried by a vendor.
Figure 5B:
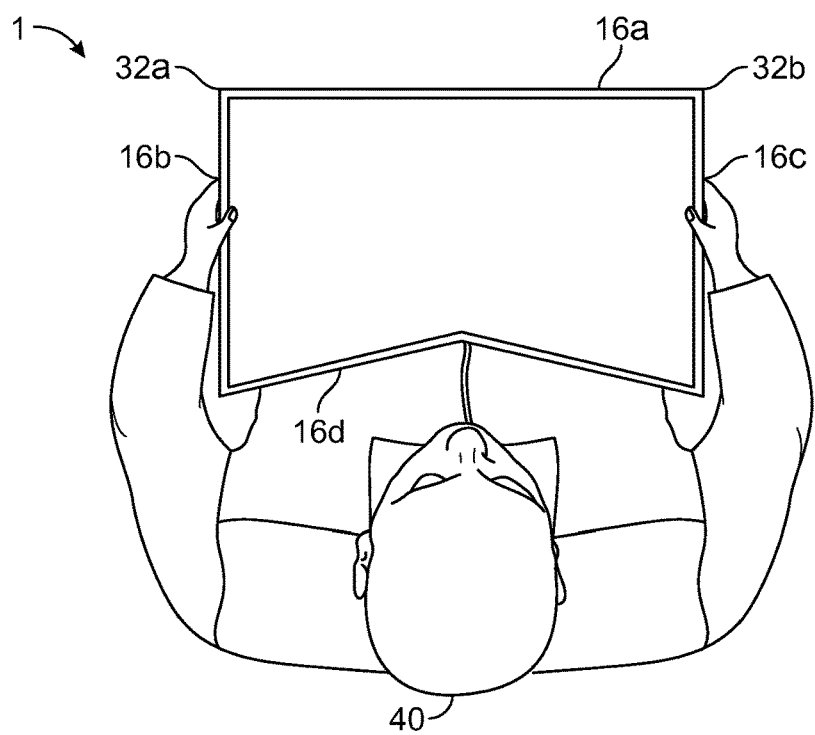

Referring now to FIGS. 5A and 5B, therein illustrated there is a cross-section view along the line A-A of vendor trays 1 according to various exemplary embodiments. For example, the vendor tray 1 may include a plurality of separating walls 24 that define a plurality of compartments for carrying the vendible items.

At least one of the plurality of upstanding walls 16 includes an electronic visual display 24. The electronic visual display 24 refers to any type of display technology device for displaying a graphic (ex: text, image or video) for visual reception, without producing a permanent record. For example, the electronic visual display 24 may be a flat panel display, such as a liquid crystal display, a light emitting diode (LED) display, an AMOLED (active-matrix organic light-emitting diode) display, or any other type of visual display According to various exemplary embodiments, the electronic visual display 24 may have a wide viewable angle. For example, the electronic visual display 24 may be viewable within range of about 45 to about 180 degrees. For example, the electronic visual display 24 may be an IPS panel, which provides for a wide viewable angle.

According to various exemplary embodiments, the electronic visual display 24 may have a high brightness and/or a high contrast so as to be viewable under conditions with bright ambient light. For example, the electronic visual display 24 can be configured display images at about 344 lumens to about 683 lumens. For example, the high brightness and/or high contrast properties of the electronic visual display 24 allows it to be viewable in sunny outdoor conditions.

Figure 4:
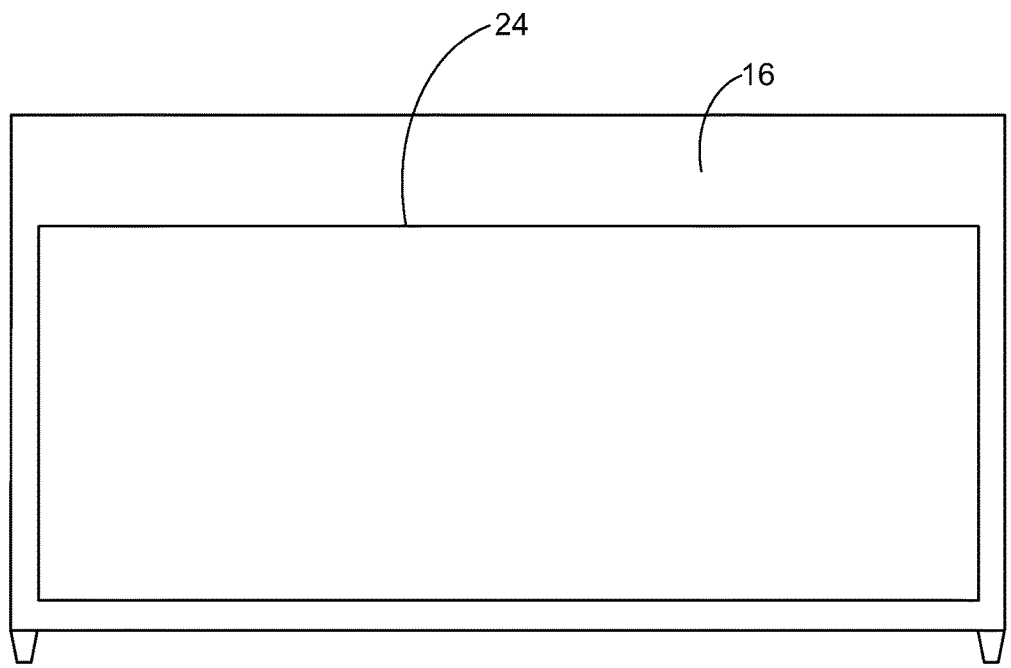
FIG. 4 illustrates a front elevation view of the vendor tray according to various exemplary embodiments.

Referring now to FIG. 4, therein illustrated is an elevation view of the vendor tray 1 according to various exemplary embodiments. Illustrated therein is an exterior surface of an upstanding wall 16 having a viewable electronic display 24. For example, the viewable area of the visual viewable electronic display 24 can occupy a large amount of the exterior surface area of the upstanding wall 16. For example, the electronic visual display 24 can occupy at least about 10, 20, 30, 40, 50, 60, 70, 80 or 90% of the exterior surface area of the upstanding wall 16. It can also be as high as 100%. For example, as illustrated in FIG. 4, the upstanding wall 16 has a width of 19 inches and a height of 7 inches while the viewable area of the viewable electronic display 24 has a width of 18 inches and a height of 5 inches.

Figure 5C:
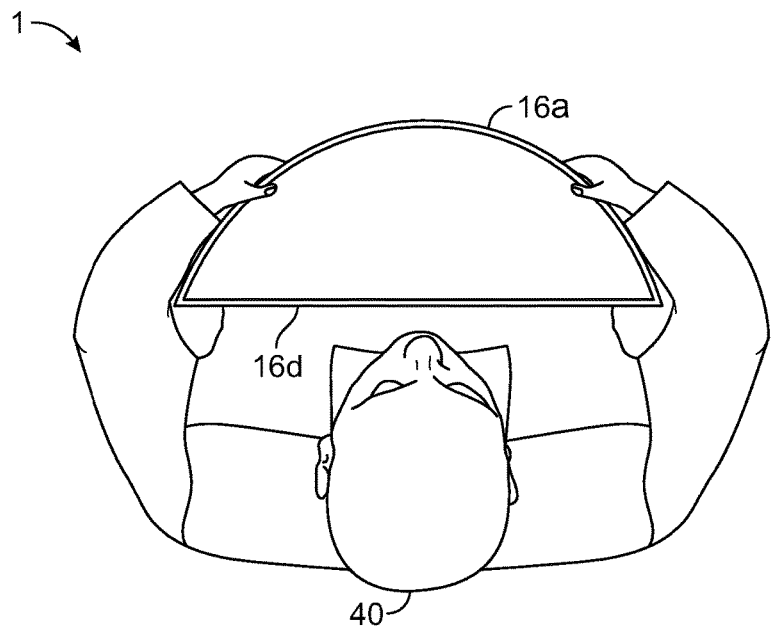

Referring now to FIGS. 5A to 5C, therein illustrated are top plan views of the vendor tray 1 according to various exemplary embodiments. The vendor trays 1 are illustrated in FIGS. 5A to 5C as being carried by a vendor 40. When viewed within a top plan view, the plurality of upstanding walls can define various open or closed shapes. For example, and as illustrated in FIGS. 5A and 5B, the first upstanding wall 16a, second upstanding wall 16b, third upstanding wall 16c and fourth upstanding wall 16d can define a generally polygonal shape, such as a generally quadrilateral shape. The generally quadrilateral shape may be generally trapezoidal, thereby having at least one pair of substantially parallel upstanding walls 16a, 16d, as shown in FIG. 5A. It will be understood that one or more of the upstanding walls 16 can be slightly curved (i.e. non-straight), as long as an overall generally polygonal shape is defined. For example, the fourth upstanding walls of FIG. 5B define a generally rectangular shape wherein the fourth upstanding wall 16d is slightly concavely curved.

According to various exemplary embodiments, the plurality of upstanding walls can include at least one substantially curved wall. For example, and as illustrated in FIG. 5C, a first upstanding wall 16a having the at least one electronic visual display 24 is curved and its ends meet with an opposing upstanding wall 16d. For example, the electronic visual display 24 can be a flexible electronic visual display 24 curvedly disposed over the surface of the first upstanding wall 16a. The curved electronic visual display 24 may be a curved LED display.

At least one of the upstanding walls 16 of the vendor tray 1 represents an audience-facing wall of the vendor tray 1. The audience-facing wall represents any upstanding wall 16 having an exterior surface that is oriented away from the vendor 40 when the vendor tray 1 is appropriately carried by the vendor. Accordingly, an audience-facing wall presents an upstanding wall that is intended to be viewable by the audience when the vendor tray 1 is appropriately carried by the vendor 40. For example, first upstanding wall 16a of FIGS. 5A, 5B and 5C are all an audience-facing wall of the examples of vendor trays illustrated therein.

According to various exemplary embodiments, a plurality of the upstanding walls 16 each have at least one visual viewable electronic display 24. For example, at least two of the audience-facing walls each have at least one visual viewable electronic display 24. For example, each of the audience-facing walls have at least one visual viewable electronic display 24.

According to various exemplary embodiments where the upstanding walls define a generally quadrilateral shape, a second upstanding wall (ex: second upstanding wall 16b in FIGS. 5A and 5B) that shares a first corner 32a with the first upstanding wall 16a is an audience-facing wall and has at least one second visual viewable electronic display 24. Furthermore, a third upstanding wall (ex: third upstanding wall 16c in FIGS. 5A and 5B) that shares a second corner 32b with the second upstanding wall 16b is an audience-facing wall and has at least one third visual viewable electronic display 24.

At least one of the upstanding walls 16 of the vendor tray 1 represents a vendor-facing wall of the vendor tray 1. The vendor-facing wall represents any upstanding wall 16 having an exterior surface that is oriented towards a vendor when the vendor tray 1 is appropriately carried by the vendor. Accordingly, a vendor-facing wall represents an upstanding wall that is not intended to be viewable by the audience when the vendor tray 1 is appropriately carried by the vendor. For example, the fourth upstanding wall 16d of FIGS. 5A, 5B and 5C are all a vendor-facing wall of the examples of vendor trays 1 illustrated therein. As illustrated in FIGS. 5A, 5B, and 5C, the exterior surface of the vendor-facing wall 16d is oriented towards the vendor 40. The exterior surface of the vendor-facing wall 16d may abut against the front of torso of the vendor 40 when being carried.

According to various exemplary embodiments where the upstanding walls 16 define a generally quadrilateral shape a fourth upstanding wall (ex: fourth upstanding wall 16d in FIGS. 5A and 5B) that does not share a corner with the first upstanding wall 16a is a vendor-facing wall. For example, and as illustrated in FIGS. 5A and 5B, the fourth upstanding wall 16d that is opposing the first upstanding wall 16 is a vendor-facing wall.

In the case where the upstanding walls 16 define the generally trapezoidal shape, as illustrated in FIGS. 5A and 5B, the first upstanding wall 16a having a viewable electronic display 24 corresponds to a first of the parallel walls and the fourth upstanding wall 16d corresponds to a second of the parallel walls.

According to various exemplary embodiments, the vendor-facing wall is free (i.e. does not include) of a viewable electronic display 24. Since the vendor-facing wall is not intended to be viewed by the audience of the live event, there is no need to provide a viewable electronic display 24 on this wall. Advantageously, having a vendor-facing wall that is free of the viewable electronic display 24 can decrease the cost to fabricate the vendor tray 1, reduce the overall weight of the vendor tray 1, and/or reduce the battery consumption of the vendor tray 1.

According to various exemplary embodiments, the vendor-facing wall includes a viewable electronic display that has a viewable area that is substantially smaller than the viewable area of the viewable electronic display 24 of any audience-facing wall. For example, the viewable electronic display of the vendor-facing wall occupies no more than about 10 to about 30% or no more than about 10 to about 20% of the total surface area of the vendor-facing wall. The viewable electronic display of the vendor-facing wall may be useful for the vendor to review the information being displayed on the viewable electronic display(s) 24 of the audience-facing wall(s). Since this viewable electronic display is intended to only be viewed at close distance by the vendor 40, its viewable area can be made much smaller than the viewable electronic displays 24 of the audience-facing walls of the vendor tray 1. Advantageously having a viewable electronic display on the vendor-facing wall that has a viewable area that is substantially smaller than the viewable area of the viewable electronic display(s) 24 of the audience-facing wall(s) having a vendor-facing wall that is free of the viewable electronic display 24 can decrease the cost to fabricate the vendor tray 1, reduce the overall weight of the vendor tray 1, and/or reduce the battery consumption of the vendor tray 1.

According to another example, at least two, three or four walls can include the same viewable electronic display. Each of these displays can be of same size. Such configurations can be useful when a vendor holds, rests or supports the tray on his/her head.

The vendor tray 1 further includes at least one battery 48 for providing electrical power to the one or more viewable electronic displays 24 and other electronic or electrical components of the vendor tray 1. The battery 48 may be chosen to have a form factor that allows it to be embedded in one or more of the upstanding walls 16 and/or the bottom wall 8.

The one or more batteries 48 may be suitably located within the vendor tray 1 to improve weight distribution of the vendor tray 1. For example, where a plurality of batteries 48 are provided, each of the batteries 48 may be suitably located within the vendor tray 1 to improve weight distribution. The weight of the batteries may be distributed so as to promote comfort of the vendor 40 when carrying the vendor tray 1.

According to one exemplary embodiment, at least one of the one or more batteries 48 may be located within the bottom wall 8.

According to one exemplary embodiment, at least one of the batteries 48 may be located within the vendor-facing wall.

For example, more than 25% of the batteries 48 by weight may be located within the vendor-facing wall. For example, more than half of the batteries 48 by weight may be located within the vendor-facing wall.

The vendor tray 1 is often carried by a vendor 40 by abutting the vendor-facing wall against the torso of the vendor 40. Accordingly, the vendor-facing represents a pivot point or fulcrum about which the vendor tray 1. It will be appreciated that placement of some of batteries 48 within the vendor-facing wall also places these batteries 48 at a location close to the pivot point. Accordingly, the torque on the vendor tray 1 due to gravitational forces on these batteries 48 is reduced when compared to placement of batteries 48 elsewhere in the vendor tray 1. Consequently, the vendor tray 1 is made easier and/or more comfortable to carry through placement of one or more batteries 48 within the vendor-facing wall.

According to various exemplary embodiments, the exterior surface of at least one of the audience-facing wall that has a viewable electronic display 24 may have formed therein a recess 56. The viewable electronic display 24 can be received within the recess 56, thereby reducing the overall thickness of the audience-facing wall. For example, the model/make of the viewable electronic display 24 and the thickness of the audience-facing wall 16 can be chosen together so as to minimize the thickness of the audience-facing wall while accommodating the viewable electronic display 24 and providing sufficient structural rigidity to the vendor tray 1.

The at least one audience-facing wall that has a viewable electronic display 24 may further have a transparent protective member disposed over at least the viewable area of the viewable electronic display 24. For example, the transparent protective member is waterproof and can provide protection of the viewable electronic display 24 against water, thereby allowing the vendor tray 1 to be used in wet conditions, such as on rainy days.

According to various exemplary embodiments, the transparent protective member can be formed of a material (ex: have a refractive index) that reduces glare from ambient light reflecting off of the viewable electronic display 24.

Figure 6:
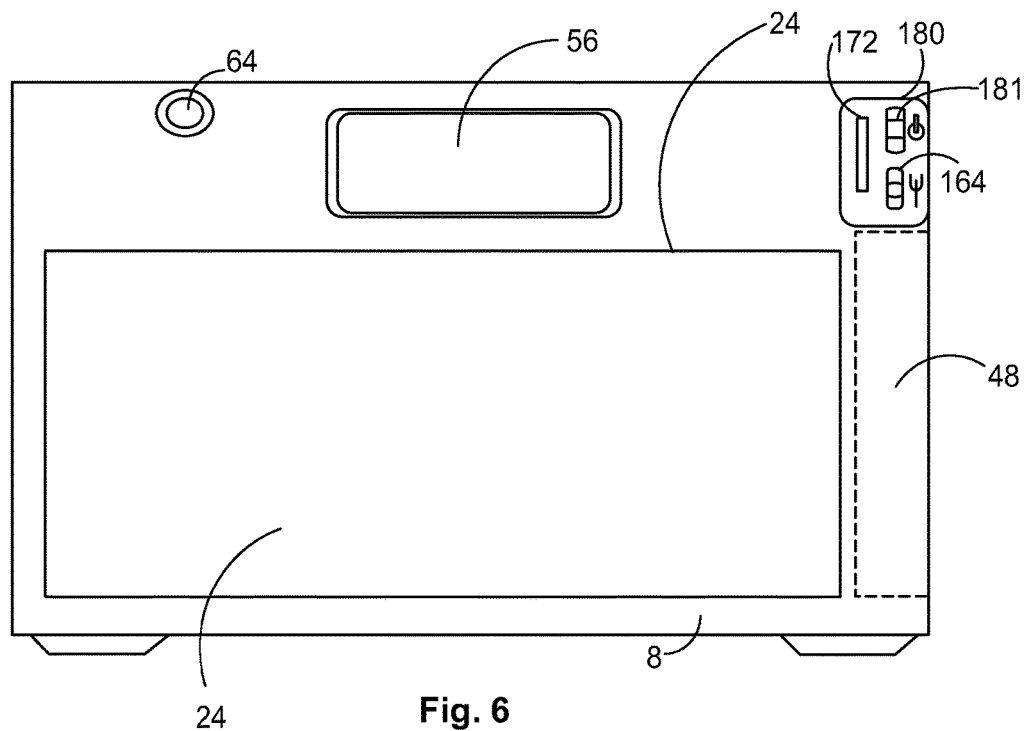
FIG. 6 illustrates a side elevation view of a vendor tray according to one exemplary embodiment.
Figure 7:
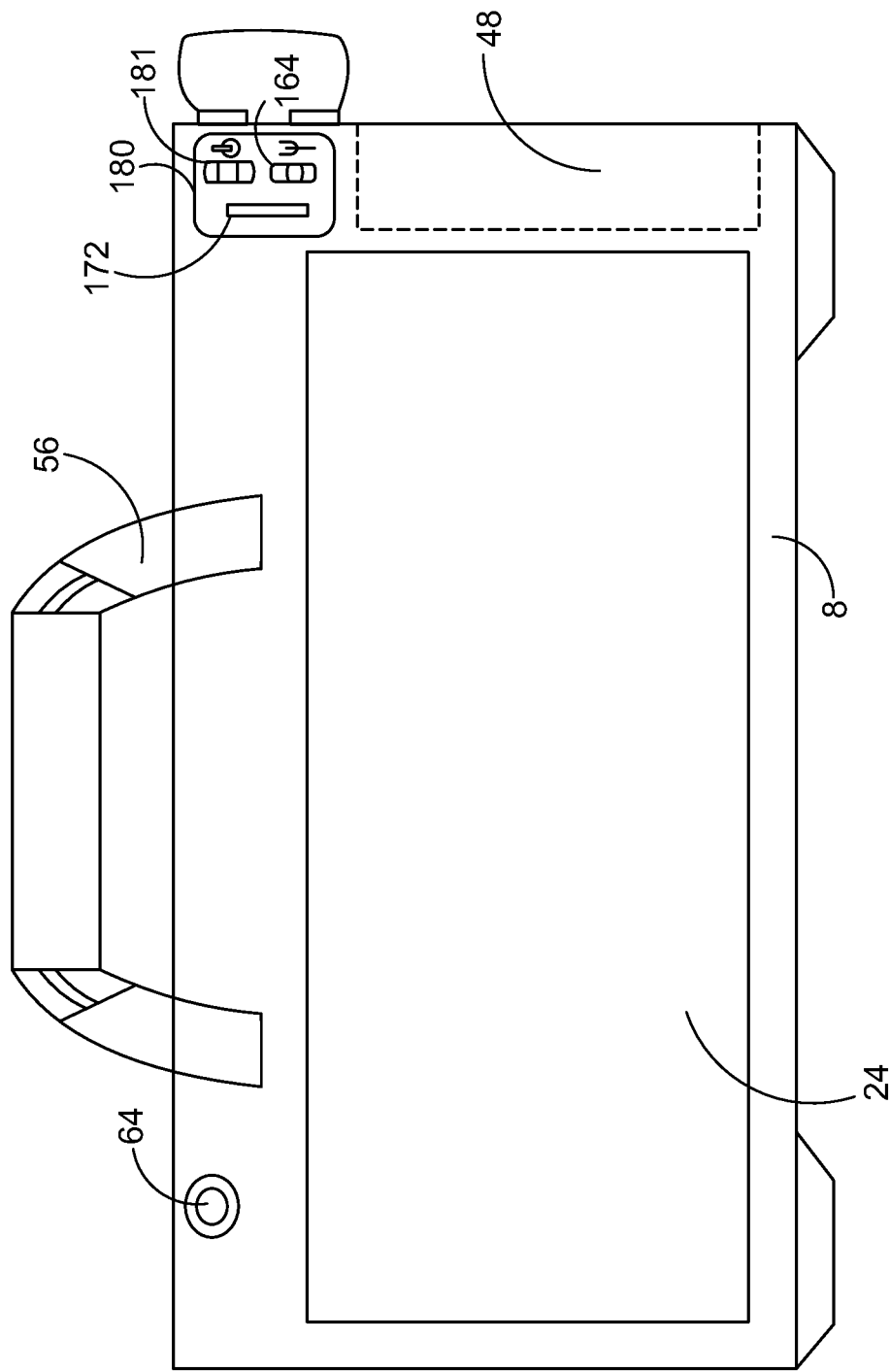
FIG. 7 illustrates a side elevation view of a vendor tray according to an alternative exemplary embodiment.

Referring now to FIGS. 6 and 7, therein illustrated are side elevation views of the vendor tray 1 according to two exemplary embodiments. It will be appreciated that FIG. 6 illustrates a side upstanding wall of the vendor tray 1. The side upstanding wall corresponds to the upstanding walls 16 that are aligned with the sides of the vendor 40 as the vendor tray 1 is being carried. For example, second and third upstanding walls 16b and 16c of FIGS. 5A and 5B are side upstanding walls.

The side upstanding wall 16 may have at least one tray handling mechanism that permits handling of the vendor tray 1 by a vendor 40. The tray handling mechanism may be any one of a handle 56 or attachment 64. The handle 56 can be grasped by the vendor 40 to carry the vendor tray 1. The attachment 64 allows attachment thereto of one or more tray supports, such as straps or harnesses, that can be worn by the vendor 40 when carrying the vendor tray 1.

According to various exemplary embodiments, the side upstanding wall of the vendor tray 1 has both a tray handling mechanism and a viewable electronic display 24. The tray handling mechanism is positioned at a top portion of the side upstanding wall 16b and the viewable electronic display 24 is positioned below the tray handling mechanism(s) 56 and/or 64. Accordingly, the vendor tray 1 can be handled and carried by the vendor 40 grasping the handle 56 and/or attaching one or more tray supports to the attachment 64 while leaving the viewable area of the viewable electronic display 24 of the side upstanding wall 16b unobstructed.

For example, and as illustrated in FIG. 6, the handle 56 is an integrated handle formed as an opening in the side upstanding wall 16b of the vendor tray 1. According to one example, the side upstanding wall has a depth of 14 inches and height of 8 inches while the viewable area of the viewable electronic display 24 has a width of 12 inches and a height of 5 inches.

For example, and as illustrated in FIG. 7, the handle 56 is a hanging handle. According to one example, the side upstanding wall has a depth of 14 inches and a height 0f 7 inches while the viewable area of the viewable electronic display 24 has a width of 12 inches and a height of 5 inches.

Figure 8:
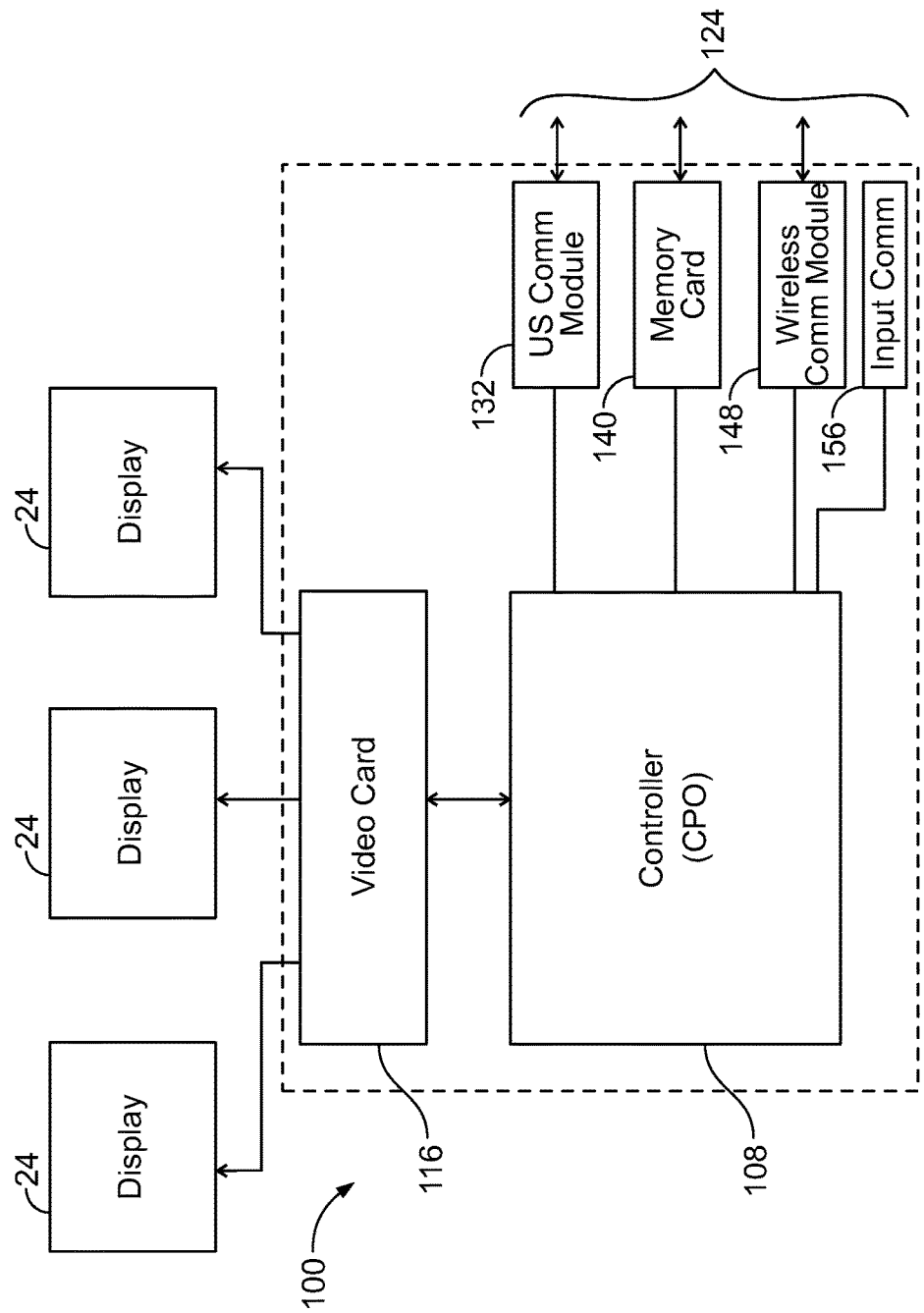
FIG. 8 illustrates a schematic diagram of a control system for controlling one or more viewable electronic displays according to various exemplary embodiments.

Referring now to FIG. 8, therein illustrated is a schematic diagram of a control system 100 for controlling the one or more viewable electronic displays 24 of the vendor tray 1. The control system 100 includes a controller 108, one or more video adaptors 116, and at least one input module 124.

The controller 108 described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller 108 is configured to receive from display commands from the at least one input module 124 and to process the display commands to output suitable display signals to the one or more video adaptors 116. The one or more video adaptors 116 are connected to the one or more viewable electronic displays 24 and can generate a feed of output images based on the received display signals for displaying on the one or more viewable electronic displays 24.

The controller 108, the video adaptor(s) 116 and the at least one input module may be implemented as separate hardware components, which may be interconnected by cables and/or interconnected within a system board. For example, the control system 100 may be implemented as an embedded system. Alternatively, the control system may be implemented as a system-on-chip, wherein the controller 108 and one or more of the video adaptor(s) and the input module 124 is integrated on a single chip.

The at least one input module 124 may include at least one of a data module (ex: USB communication module) 132, memory card module 140, wireless communication module 148 and user interface module 156.

The data module 132 may be connected to a data port 164 for attachment with an external data storage device such as a USB drive. The data port 164 may also be used to electrically charge the batteries 48 of the vendor tray 1. The controller 108 can read from the external data device display commands stored thereon.

The memory card module 140 may be connected to a memory card reader 172. The controller 108 can read from a memory card inserted in the memory card reader 172 display commands stored thereon.

The wireless communication module 148 may be part of a wireless communication system that may be configured to communicate wirelessly over short range and/or over a long range. For example, for short range communication, the communication subsystem may be configured in accordance with short range communication standards such as Wi-Fi, Bluetooth, Near Field Communication, etc. For example, for long range communication, the communication subsystem may be configured in accordance with various long range standards, such as the Global System for Mobile Communication (GSM), General Packet Radio Services (GPRS) 3GPP and 3GPP2, High-Speed Packet Access (HSPA) standards such as High-Speed Downlink Packet Access (HSDPA), 3GPP LTE, LTE, LTE Advanced, WiMax, and Flash-OFDM standards. New standards are still being defined, but it is believed that they will have similarities to the network behaviour described herein, and it will also be understood by persons skilled in the art that the various embodiments described herein should be able to be adapted to work with any other suitable standards that are developed in the future.

The controller 108 can receive via the wireless communication module 148 display instructions transmitted from a remote device. Advantageously, the control system 100 can be controlled remotely to change the information being displayed on the at least one viewable electronic display 24 of the vendor tray 1. For example, real-time information, including real-time information pertaining to the live event, can be transmitted to the control system 100 of the vendor tray 1 and displayed on the at least one viewable electronic display 24. For example, the status of the live event can be displayed in real-time. For example, the status of a live sporting event may include, the score, the time left (ex: period, quarter, inning, etc.), or current play (ex: number of strikes/balls/outs, current down, power play, substitution etc.). For example, information being displayed on the viewable electronic display 24 may be updated in response to a sub-event of the live event. For example, a particular graphic (image or video) may be shown in response to the sub-event. For example, for a live sporting event, the sub-event may be a scoring event (ex: touch-down, run, goal, etc.) or a non-scoring event (strike-out, penalty, sack, etc.) Where a plurality of vendor trays 1 are being used at a live event, the viewable electronic displays 24 of the vendor trays 1 may be controlled substantially at the same time via display commands transmitted wirelessly to the plurality of vendor trays 1.

The user interface module 156 may be connected with a user interface device, such as a keypad, touchpad, or mouse. A user can input display commands through interaction with the user interface device.

The control system 100 may be disposed in any one the upstanding walls 16 or bottom wall 8 of the vendor tray 1. Preferably, the control system 100 is located within the vendor-facing upstanding wall of the vendor tray 1. For example, the control system 100 is located in proximity of the batteries 48.

The vendor tray 1 may further include a control panel 180 that is located on an exterior surface of the any one of the upstanding walls 16. The control panel 180 includes at least an/off button for turning on and off electrical components of the vendor tray 1. The control panel 180 may further include the data port 164, memory card slot 172 and or user interface device.

Preferably, the control panel 180 is located on the surface of one of the side upstanding walls in proximity of the vendor-facing wall. Accordingly, the control panel 180 is provided at a location that is easily accessible by the vendor 40, even when the vendor tray 1 is being carried by the vendor 40.

Figure 9:
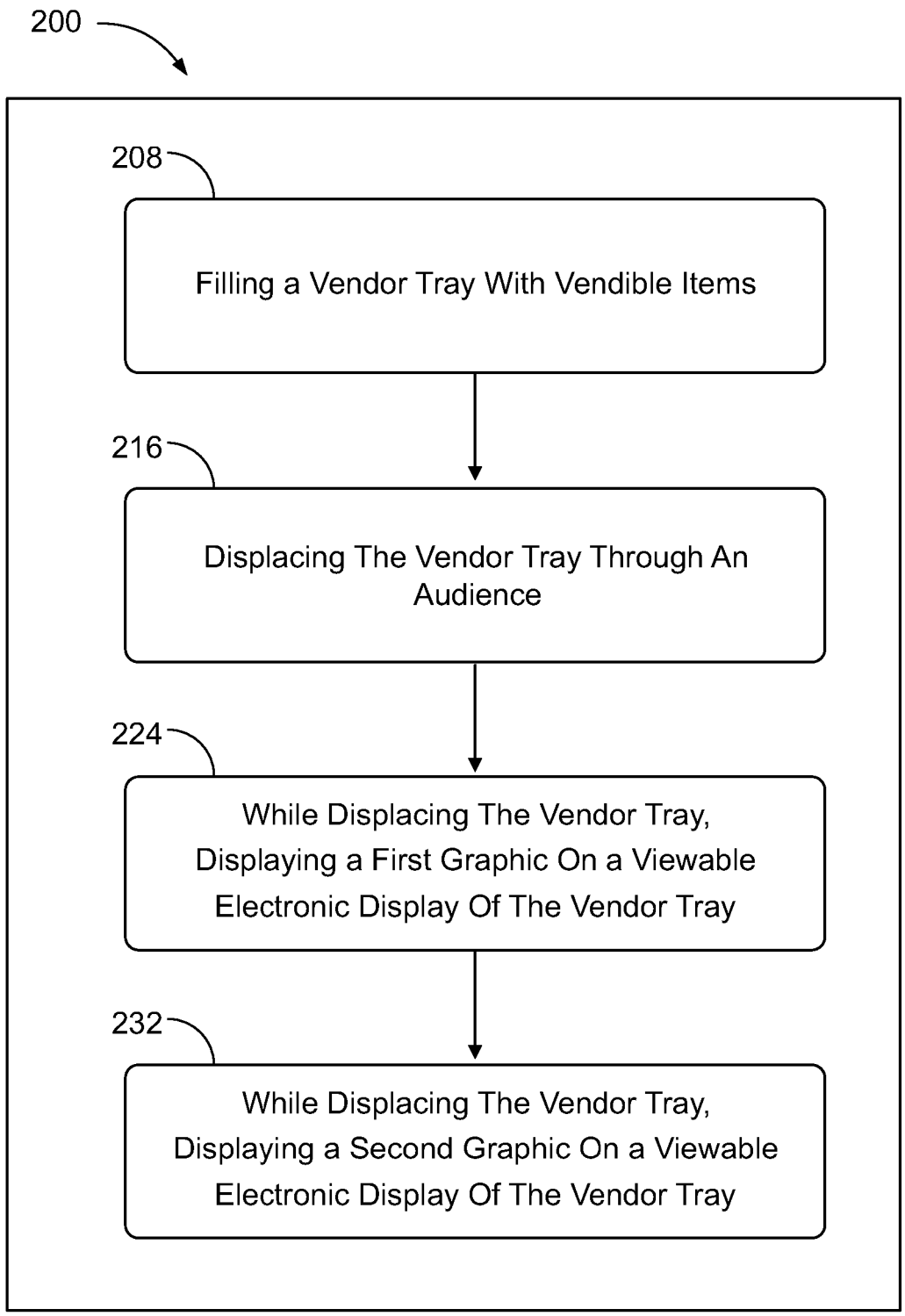
FIG. 9 illustrates a schematic diagram of an exemplary method for vending items at a live event.

Referring now to FIG. 9, therein illustrated is a schematic diagram of a method 200 for vending items at a live event.

At 208, a vendor tray 1 is provided having at least one vendible item supported within the vendor tray 1. For example, the vendible item is any one of a food item, drink item, and merchandising item.

At 216, the vendor tray 1 is displaced through the audience of the live event. For example, as is common at live events, the vendor carries the vendor tray 1 through aisles of the stands of the venue at which the live event is occurring so that members of the audience can purchase the vendible items from the vendor.

At 224, as the vendor tray 1 is displaced through the audience, a first graphic (ex: image, text, and/or video) is displayed at a first point in time on at least one viewable electronic device 24 of at least one upstanding wall 16 of the vendor tray 1.

At 232, as the vendor tray 1 is continuing to be displaced through the audience, a second graphic (ex; image, text and/or video) that is different from the first graphic is displaced at a second point in time on the at least one viewable electronic device 24 of the at least one upstanding wall 16 of the vendor tray 1.

The first graphic or second graphic may include information related to the vendible item, the live event, an advertisement or publicity or combinations thereof. For example, the first graphic can include information relating to the vendible item and the second graphic can include information relating to the live event. For example, the first graphic and the second graphic may be displayed interchangeably over time and interspersed in time.

The information related to the vendible item may include the price of the vendible item, the brand and make, and/or the nutritional value of the vendible item.

The information related to the live event may include information related to a participant of the live event, a status of the live event, a purchasable item associated to the live event, or another event related to the live event.

According to various exemplary embodiments, the method 200 further includes receiving at a communication module of the vendor tray 1 display command transmitted from a remote device and modifying the graphic being displayed on the viewable electronic display 24 in response to the received display commands.

According to various exemplary embodiments, the graphic being displayed on the at least one viewable electronic display 24 of the vendor tray is updated substantially in real time in response to the occurrence of a sub-event during the live event. For example, a particular graphic (image or video) may be shown in response to the sub-event.

For example, the sub-event may be a change in the status of the live event. For example, the status of a live sporting event may include, the score, the time left (ex: period, quarter, inning, etc.), or current play (ex: number of strikes/balls/outs, current down, power play, substitution etc.).

For example, for a live sporting event, the sub-event may be an action that occurred, such as scoring event (ex: touch-down, run, goal, etc.) or a non-scoring event (strike-out, penalty, sack, etc.)

The person skilled in the art would understand that the various properties or features presented in a given embodiment can be added and/or used, when applicable, to any other embodiment covered by the general scope of the present disclosure.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

The invention claimed is:

1. A vendor tray comprising:
   a bottom wall; and
   a plurality of upstanding walls extending from the bottom wall and defining with the bottom wall a vending space for carrying the vendible items,
   wherein at least one of the upstanding walls is an audience-facing wall having a first viewable electronic display,
   wherein another one of the upstanding walls is a vendor-facing wall,
   and wherein a battery pack powering the first viewable electronic display is disposed within the vendor-facing wall.

2. The vendor tray of claim 1, wherein the vendor-facing wall is free of a viewable electronic display.

3. The vendor tray of claim 1, wherein the vendor-facing wall has a viewable electronic display having a viewable area that is substantially smaller than a viewable area of the first viewable electronic display.

4. The vendor tray of claim 1, wherein the upstanding walls define a generally quadrilateral shape, and wherein a second upstanding wall sharing a first corner with a first upstanding wall comprises a second viewable electronic display and a third upstanding wall sharing a second corner with the first upstanding wall comprises a third viewable electronic display.

5. The vendor tray of claim 4, wherein the second and third upstanding walls each comprise a tray handling mechanism.

6. The vendor tray of claim 5, wherein the tray handling mechanism is chosen from a hanging handle, an integrated handle, a strap attachment, and a harness attachment.

7. The vendor tray of claim 5, wherein a first of the tray handling mechanism is located on a top portion of the second upstanding wall and the second viewable electronic display is positioned below the first tray handling mechanism.

8. The vendor tray of claim 4, wherein the battery pack is disposed within a fourth upstanding wall opposite the first upstanding wall.

9. The vendor tray of claim 8, wherein the upstanding walls define a generally trapezoidal shape, the first upstanding wall corresponding to a first parallel wall and the fourth wall corresponding to a second parallel wall opposite the first upstanding wall.

10. The vendor tray of claim 1, wherein the first upstanding wall comprises:
    a recess, the first viewable electronic display being disposed within the recess; and
    a transparent protective member for shielding the viewable electronic display.

11. The vendor tray of claim 1, further comprising a controller operatively coupled to the at least one viewable electronic display, the controller configured for:
    controlling the at least one viewable electronic display to display a first graphic at a first point in time; and
    controlling the at least one viewable electronic display to display a second graphic at a second point in time.

12. The vendor tray of claim 11, further comprising a data port operationally coupled to the controller, the controller receiving display commands from a data storage device inserted in the data port, the commands for controlling the at least one viewable electronic display.

13. The vendor tray of claim 11, further comprising a wireless communication module for receiving instructions from a remote wireless devices, the instructions for controlling the at least one viewable electronic display.

14. A method for vending items at a live event, the method comprising:
    providing a vendor tray having at least one vendible item supported therein;
    displacing the vendor tray through an audience of the live event; and
    while displacing the vendor tray through the audience, displaying on an viewable electronic display of an upstanding wall of the vendor tray a first graphic providing information related to at least one of the vendible item and the live event,
    receiving at a communication module of the vendor tray a display command from a remote device; and
    in response to the received display command, modifying the first graphic being displayed on the viewable electronic display of the upstanding wall.

15. The method of claim 14, further comprising displaying a second graphic providing information related to the at least one of the vendible item and the live event, the second graphic being different from the first graphic.

16. The method of claim 15, wherein the first graphic provides information related to the vendible item and the second graphic provides information related to the live event.

17. The method of claim 14, wherein the information related to the live event includes a participant of the live event, a status of the live event, a purchasable item associated to the live event, an advertisement or publicity and/or another event related to the live event.

18. A vendor tray comprising:
    a bottom wall; and
    a plurality of upstanding walls extending from the bottom wall and defining with the bottom wall a vending space for carrying the vendible items, wherein at least one of the upstanding walls is an audience-facing wall having a first viewable electronic display,
    and wherein another one of the upstanding walls is a vendor-facing wall having a viewable electronic display having a viewable area that is substantially smaller than a viewable area of the first viewable electronic display.

19. A vendor tray comprising:

a bottom wall; and a plurality of upstanding walls extending from the bottom wall and defining with the bottom wall a vending space for carrying the vendible items, wherein at least one of the upstanding walls is an audience-facing wall having a first viewable electronic display, wherein another one of the upstanding walls is a vendor-facing wall, wherein the upstanding walls define a generally quadrilateral shape, and wherein a second upstanding wall sharing a first corner with a first upstanding wall comprises a second viewable electronic display and a third upstanding wall sharing a second corner with the first upstanding wall comprises a third viewable electronic display, wherein the second and third upstanding walls each comprise a tray handling mechanism, and wherein a first of the tray handling mechanism is located on a top portion of the second upstanding wall and the second viewable electronic display is positioned below the first tray handling mechanism.

20. A vendor tray comprising:

a bottom wall; and a plurality of upstanding walls extending from the bottom wall and defining with the bottom wall a vending space for carrying the vendible items, wherein at least one of the upstanding walls is an audience-facing wall having a first viewable electronic display, wherein another one of the upstanding walls is a vendor-facing wall, wherein the upstanding walls define a generally quadrilateral shape, and wherein a second upstanding wall sharing a first corner with the first upstanding wall comprises a second viewable electronic display and a third upstanding wall sharing a second corner with the first upstanding wall comprises a third viewable electronic display, and wherein a battery pack is disposed within a fourth upstanding wall opposite the first upstanding wall.

21. A vendor tray comprising:

a bottom wall; and a plurality of upstanding walls extending from the bottom wall and defining with the bottom wall a vending space for carrying the vendible items, wherein at least one of the upstanding walls has a first viewable electronic display, a controller operatively coupled to the at least one viewable electronic display, the controller configured for:

controlling the at least one viewable electronic display to display a first graphic at a first point in time; and controlling the at least one viewable electronic display to display a second graphic at a second point in time, and a wireless communication module for receiving instructions from a remote wireless devices, the instructions for controlling the at least one viewable electronic display.

* * * * *